(12) United States Patent
Kinoshita et al.

(10) Patent No.: US 12,001,181 B2
(45) Date of Patent: Jun. 4, 2024

(54) POWER GENERATION PLANNING APPARATUS

(71) Applicant: HITACHI, LTD., Tokyo (JP)

(72) Inventors: Yoshihito Kinoshita, Tokyo (JP); Masahiro Watanabe, Tokyo (JP)

(73) Assignee: HITACHI, LTD., Tokyo (JP)

( * ) Notice: Subject to any disclaimer, the term of this patent is extended or adjusted under 35 U.S.C. 154(b) by 407 days.

(21) Appl. No.: 17/299,393

(22) PCT Filed: Oct. 18, 2019

(86) PCT No.: PCT/JP2019/041223
§ 371 (c)(1),
(2) Date: Jun. 3, 2021

(87) PCT Pub. No.: WO2020/116043
PCT Pub. Date: Jun. 11, 2020

(65) Prior Publication Data
US 2022/0057768 A1    Feb. 24, 2022

(30) Foreign Application Priority Data
Dec. 6, 2018    (JP) ................................ 2018-229089

(51) Int. Cl.
*G05B 19/042*    (2006.01)
(52) U.S. Cl.
CPC .... *G05B 19/042* (2013.01); *G05B 2219/2639* (2013.01)
(58) Field of Classification Search
CPC ..................... G05B 19/042; G05B 2219/2639
(Continued)

(56) References Cited

U.S. PATENT DOCUMENTS

| 2010/0076825 A1* | 3/2010 | Sato | ........................ B60L 53/65 |
| | | | 705/14.1 |
| 2012/0323395 A1* | 12/2012 | Sato | ........................ H02J 3/003 |
| | | | 700/297 |

FOREIGN PATENT DOCUMENTS

| JP | 2001-211548 A | 8/2001 |
| JP | 2010011615 A | * 1/2010 |

(Continued)

OTHER PUBLICATIONS

Motonobu Yoshikawa, Hiroshi Nakajima, Yoshiyuki Kurebayashi, Toshiyuki Sawa, Mitsuo Kinoshita, Yuuji Nakata, "Method for Unit Commitment of Thermal and Pumped-storage Hydro Power Plants", IEE Japan, vol. 114-8, No. 12.
Toshiyuki Sawa, Yasuo Sato, Mitsuo Tsurugai, Tsukasa Onishi, "Daily Integrated Generation Scheduling for Thermal, Pumped-Storage Hydro and Cascaded Hydro Units and Purchasing Power Considering Network Constraints", IEEJ Trans. PE, vol. 128, No. 10 (2008).

(Continued)

*Primary Examiner* — Jigneshkumar C Patel
(74) *Attorney, Agent, or Firm* — Volpe Koenig

(57) ABSTRACT

A power generation planning apparatus that calculates a generation plan which is a plan of starting and stopping and output power of electric generators. The apparatus includes an information calculation unit that calculates demand and supply of electric power, a plan calculation unit that calculates the generation plan of the starting and stopping and the output power of the electric generators by using, as an input, the generation information calculated by the information calculation unit, and an adjustment unit that calculates a generation plan with a time interval shorter than the generation plan by adjusting a starting initiation time and/or a stopping initiation time of the electric generator in the generation plan such that total power generation cost is reduced by using, as inputs, the generation plan calculated by the plan calculation unit and generation information with a time interval shorter than the generation plan.

6 Claims, 6 Drawing Sheets

(58) Field of Classification Search
USPC .......................................................... 700/291
See application file for complete search history.

(56) References Cited

FOREIGN PATENT DOCUMENTS

| JP | 2010011670 A | * | 1/2010 |
| JP | 4577232 B2 | * | 11/2010 |
| JP | 2012-178929 A | | 9/2012 |
| JP | 2012178929 A | * | 9/2012 |
| JP | 2016-035719 A | | 3/2016 |

OTHER PUBLICATIONS

Takayuki Shiina, "Stochastic Programming", Asakura Publishing Co., Ltd., pp. 99-110 (2015).
International Search Report of PCT/JP2019/041223 dated Dec. 10, 2019, 2 pgs.
Christopher Michael Bishop, et al., "Statistical Prediction by Bayesian Theory on Pattern Recognition and Machine Learning", Maruzen Publishing Co. Ltd., pp. 28-31 (2012).
Meitetsu Kin, "Data Science Learned in R 3 Bayesian Statistical Data Analysis", Kyoritsu Shuppan Co., Ltd., pp. 46-81 (2010).

* cited by examiner

| ELECTRIC GENERATOR NUMBER | TIME [H] | | | | | | |
|---|---|---|---|---|---|---|---|
| | 1 | 2 | 3 | 4 | 5 | ... | Tend |
| 1 | 0 | 0 | 0 | 1 | 1 | ... | 0 |
| Ngen | 0 | 1 | 1 | 1 | 1 | ... | 1 |

⇒ DASHED LINE PART IS DEVELOPED

402

| ELECTRIC GENERATOR NUMBER | TIME [H] | | | | | | |
|---|---|---|---|---|---|---|---|
| | 1.0 | 1.25 | 1.5 | 1.75 | 2.0 | ... | 2.75 |
| Ngen | 0 | 0 | 1 | 1 | 1 | ... | 1 |

→ SET START TIME TO LATE TIME SUCH THAT TOTAL POWER GENERATION COST IS REDUCED

POWER GENERATION PLANNING APPARATUS

TECHNICAL FIELD

The present invention relates to a power generation planning apparatus, and is suitable for application to, for example, a power generation planning apparatus that calculates a power generation plan which is a plan of start and stop and output of electric generators.

BACKGROUND ART

In a power generation plan of electric generators in the related art, an operation state, a stop state, and an output of the electric generator that satisfy a constraint on an operation of each electric generator or power system and meet the demand of electric power are decided based on a predicted demand value at each time in a planned period. As a generation planning method for such an electric generator, there are methods described in NPL 1 and NPL 2. As illustrated in these methods, a generation plan is calculated such that total power generation cost is minimized while satisfying the constraint on the operation of each electric generator or electric power system such as supply-demand balance that the demand and supply of the electric power match, minimum continuous start that the state of the started electric generator is maintained for a fixed time, a minimum continuous stop time that the state of the stopped electric generator is maintained for a fixed time, or the like. In this generation plan, when the start and stop of even one electric generator are considered by the number of time sections n of the plan, since a huge number of $2^n$ generation plans is considered, an optimization method that minimizes the total power generation cost from among the huge number of plans in a short time is essential.

On the other hand, in recent years, renewable energy (hereinafter, referred to as variable renewable energy (VRE) of which an output power depends on climate has been interconnected to the power system. The prediction of VRE often deviates, and VRE assumed when the generation plan described above is calculated is different from an actual output power. Thus, there is concern that economic efficiency of the generation plan deteriorates. Further, an electric power market which is a system that buys and sells the electric power is introduced, and thus, it is necessary to calculate an output power plan of the electric generator while predicting fluctuation factors.

From the above, it is important to consider uncertainties such as prediction errors. NPL 3 considers the uncertainty of demand, and PTL 1 assumes that the electric power is sold in the electric power market.

CITATION LIST

Patent Literature

PTL 1: JP 2016-35719 A

Non-Patent Literature

NPL 1: Motonobu Yoshikawa, Toshiyuki Sawa, Hiroshi Nakajima, Mitsuo Kinoshita, Yoshiyuki Kurebayashi, Yuji Nakata, "Method for Unit Commitment of Thermal and Pumped Storage Hydro Power Plants", Institute of Electrical Engineers of Japan B, Vol. 114, No. 12 (1994)

NPL 2: Toshiyuki Sawa, Yasuo Sato, Mitsuo Tsurugai, Tsukasa Onishi, "Daily Integrated Generation Scheduling for Thermal, Pumped-Storage Hydro and Cascaded Hydro Units and Purchasing Power Considering Network Constraints", IEEJ Trans. PE, Vol. 128, No. 10 (2008)

NPL 3: Takayuki Shiina, "Stochastic Programming", Asakura Publishing Co., Ltd., pp 99-110 (2015)

SUMMARY OF INVENTION

Technical Problem

Here, in NPL 3 and PTL 1, a plurality of assumed cases and scenarios are considered in order to consider the uncertainty of demand and VRE, but a calculation time increases as the number of scenarios to be examined increases. Further, as the time interval of the generation plan is shortened, the calculation time further increases. Although it is considered that a factor with uncertainty changes from moment to moment, when it takes a long time to calculate the generation plan, since an assumption and a status when the generation plan is calculated change, it is considered that optimality for the total cost of the generation plan or the like deteriorates.

The present invention has been made in consideration of the above points, and an object of the present invention is to propose a power generation planning apparatus capable of calculating a generation plan in a short time.

Solution to Problem

In order to solve such problems, there is provided a power generation planning apparatus that calculates a generation plan which is a plan of start and stop and output power of electric generators. The apparatus includes a power generation information calculation unit that calculates generation information regarding demand and supply of electric power, a power generation plan calculation unit that calculates the generation plan of the start and stop and the output of the electric generators by using, as an input, the generation information calculated by the power generation information calculation unit, and a power generation plan adjustment unit that calculates a generation plan with a time interval shorter than the generation plan by adjusting a start initiation time and/or a stop initiation time of the electric generator in the generation plan such that total power generation cost is reduced by using, as inputs, the generation plan calculated by the power generation plan calculation unit and generation information with a time interval shorter than the generation plan.

According to the above configuration, for example, the generation plan with the long time interval is calculated, and the output power of the electric generators is decided by finely adjusting the start initiation time and/or the stop initiation time of the electric generator of the generation plan at the shorter time interval. Accordingly, it is possible to calculate the generation plan with the short time interval in the short calculation time.

Advantageous Effects of Invention

According to the present invention, the generation plan can be calculated in the short time.

Other objects, configurations, and effects will be made apparent in the following descriptions.

BRIEF DESCRIPTION OF DRAWINGS

FIG. 4 is a diagram illustrating an example of a start or stop schedule of electric generators according to the first embodiment.

DESCRIPTION OF EMBODIMENTS

Hereinafter, embodiments of the present invention will be described in detail with reference to the drawings.

Hereinafter, embodiments suitable for carrying out the present invention will be described. In the present embodiment, an electric power plan drafting support method used when a business operator having a plurality of power generation facilities and an electric power supplier such as an electric power broker drafts a power generation plan will be mainly described. Note that, the following embodiments are merely implementation examples and the invention itself is not intended to be limited to the following specific contents.

(1) First Embodiment (1-1) Configuration (Software)

Figure 1:
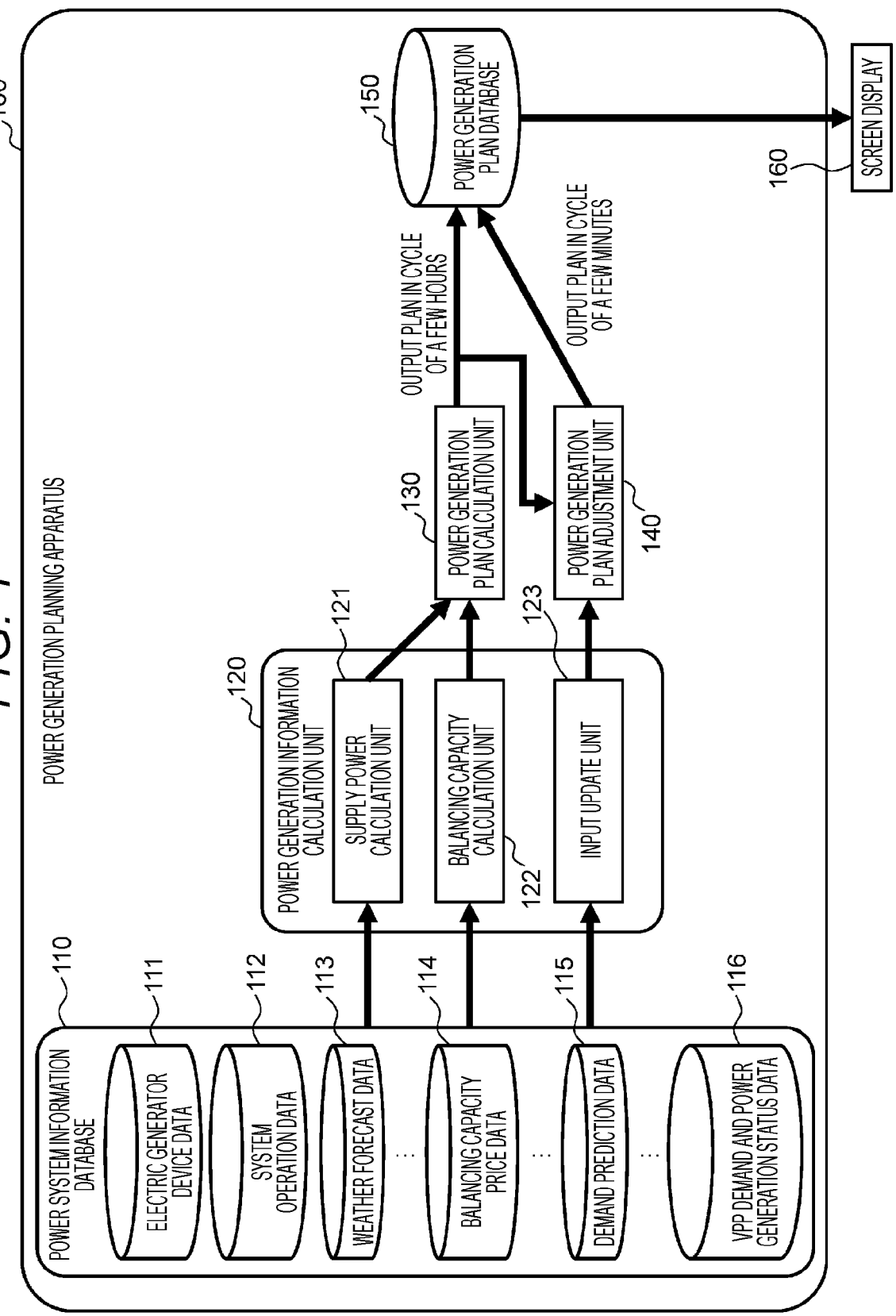
FIG. 1 is a diagram illustrating an example of a software configuration related to a power generation planning apparatus according to a first embodiment.

In FIG. 1, a reference sign 100 indicates a power generation planning apparatus according to a first embodiment as a whole.

FIG. 1 is a diagram illustrating an example of a software configuration related to the power generation planning apparatus 100. The power generation planning apparatus 100 includes a power system information database 110, a power generation information calculation unit 120, a power generation plan calculation unit 130, a power generation plan adjustment unit 140, and a power generation plan database 150. The power generation information calculation unit 120 includes a supply power calculation unit 121, a balancing power calculation unit 122, and an input update unit 123.

(1-2) Action (Software)

Electric generator device data 111, system operation data 112 such as a power transmission capacity constraint of an interconnection line of a power system, weather forecast data 113, balancing power price data 114, demand prediction data 115, virtual power plant (VPP) demand and power generation status data 116, and the like are stored in the power system information database 110.

The power generation planning apparatus 100 includes the power generation information calculation unit 120, the power generation plan calculation unit 130, the power generation plan adjustment unit 140, and the like, and calculates generation information (information on supply power, information on balancing power, and the like) related to the demand and supply of the electric power by using, as inputs, the electric generator device data 111, the system operation data 112 such as the power transmission capacity constraint of the interconnection line of the power system, the weather forecast data 113, the demand prediction data 115, and the like. More specifically, the supply power calculation unit 121 outputs, as the supply power, a total power generation amount required at a target time on a target day based on a predicted value. When a total required power generation output deviates from the supply power due to a prediction error or the like, the balancing power calculation unit 122 calculates and outputs the balancing power to correct the amount of change of the output power. The input update unit 123 outputs update values of the outputs of the supply power calculation unit 121 and the balancing power calculation unit 122 in a shorter cycle and at a shorter time interval than the supply power calculation unit 121 and the balancing power calculation unit 122.

The power generation plan calculation unit 130 calculates a start or stop schedule of all electric generators capable of outputting the amount of change of the output calculated by the balancing power calculation unit 122 and the required power generation amount calculated by the supply power calculation unit 121 and output power of each electric generator.

The power generation plan adjustment unit 140 outputs the start or stop schedule and the output power at a short time interval and in a shorter cycle by putting a start initiation time and/or a stop initiation time (start or stop time) of the electric generator forward or backward at a shorter time interval in the start or stop schedule such that total power generation cost is reduced by using, as inputs, the start or stop schedule calculated by the power generation plan calculation unit 130 and the output of the input update unit 123.

In the power generation plan database 150, the outputs of the power generation plan calculation unit 130 and the power generation plan adjustment unit 140 are recorded in the database. Note that, the data of the power generation plan database 150 may be output to a screen display 160 on a display unit 201 to be described late or the like.

(1-3) Configuration (Hardware)

Figure 2:
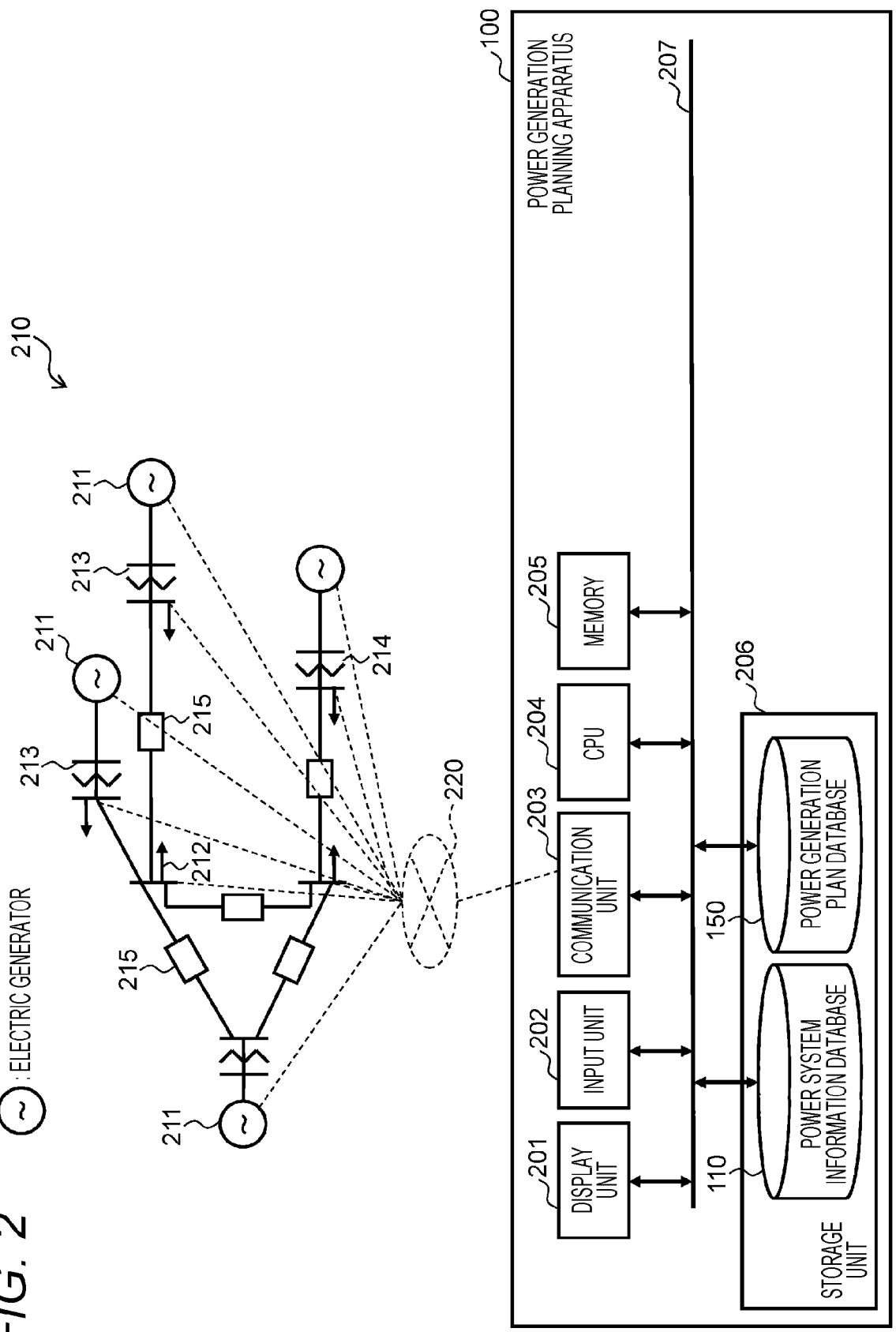
FIG. 2 is a diagram illustrating an example of a hardware composition of the power generation planning apparatus and a power system according to the first embodiment.

FIG. 2 is a diagram illustrating an example of a hardware configuration of the power generation planning apparatus 100 and a power system 210.

The power system 210 is a system in which a plurality of synchronous electric generators 211 and a load 212 are interconnected to each other via buses (nodes) 213, a transformer 214, a power transmission line 215, and the like. In the power system 210, a plurality of pieces of measurement data such as information on the electric generator 211 and information on the load 212 (demand information) are stored in the database via a communication network 220.

Note that, in FIG. 2, various measuring instruments for the purpose of protecting, controlling, and monitoring the power system 210 are appropriately installed in the nodes 213, and signals detected by the measuring instruments are sent to a communication unit 203 of the power generation planning apparatus 100 via the communication network 220. The communication unit 203 illustrated in FIG. 2 also communicates with a weather system, an electric power market system, and an aggregator such as a VPP that monitors and controls a plurality of distributed power sources and consumers.

The power generation planning apparatus 100 is a computer system, and the display unit 201 such as a display device, an input unit 202 such as a keyboard or a mouse, the communication unit 203, a central processing unit (CPU)

204, a memory 205, and a storage unit 206 that stores various databases (for example, the power system information database 110 and the power generation plan database 150) are connected to a bus line 207.

(1-4) Action (Hardware)

As the display unit 201, for example, a printer device, an audio output device, or the like may be used in place of the display device or in combination with the display device. The input unit 202 can include at least one of a keyboard switch, a pointing device such as a mouse, a touch panel, a voice instruction device, and the like. The communication unit 203 includes a circuit and a communication protocol for connection with the communication network 220. The CPU 204 specifies image data to be displayed and searches for data in various databases by executing a calculation program. The CPU 204 may be constituted by one or a plurality of semiconductor chips, or may be constituted by a computer device such as a computing server. The memory 205 is constituted by, for example, a random access memory (RAM), and stores a computer program or stores calculation result data, image data, and the like required for each processing. The data stored in the memory 205 is sent to and displayed on the display unit 201.

Note that, for example, the functions (the power generation information calculation unit 120, the power generation plan calculation unit 130, the power generation plan adjustment unit 140, and the like) of the power generation planning apparatus 100 may be achieved by reading out the program into the memory 205 and executing the program by the CPU 204 (software), may be achieved by hardware such as a dedicated circuit, or may be achieved by combining software and hardware. Further, a part of the functions of the power generation planning apparatus 100 may be achieved by another computer capable of communicating with the power generation planning apparatus 100.

(1-5) Processing Flowchart

Figure 3:
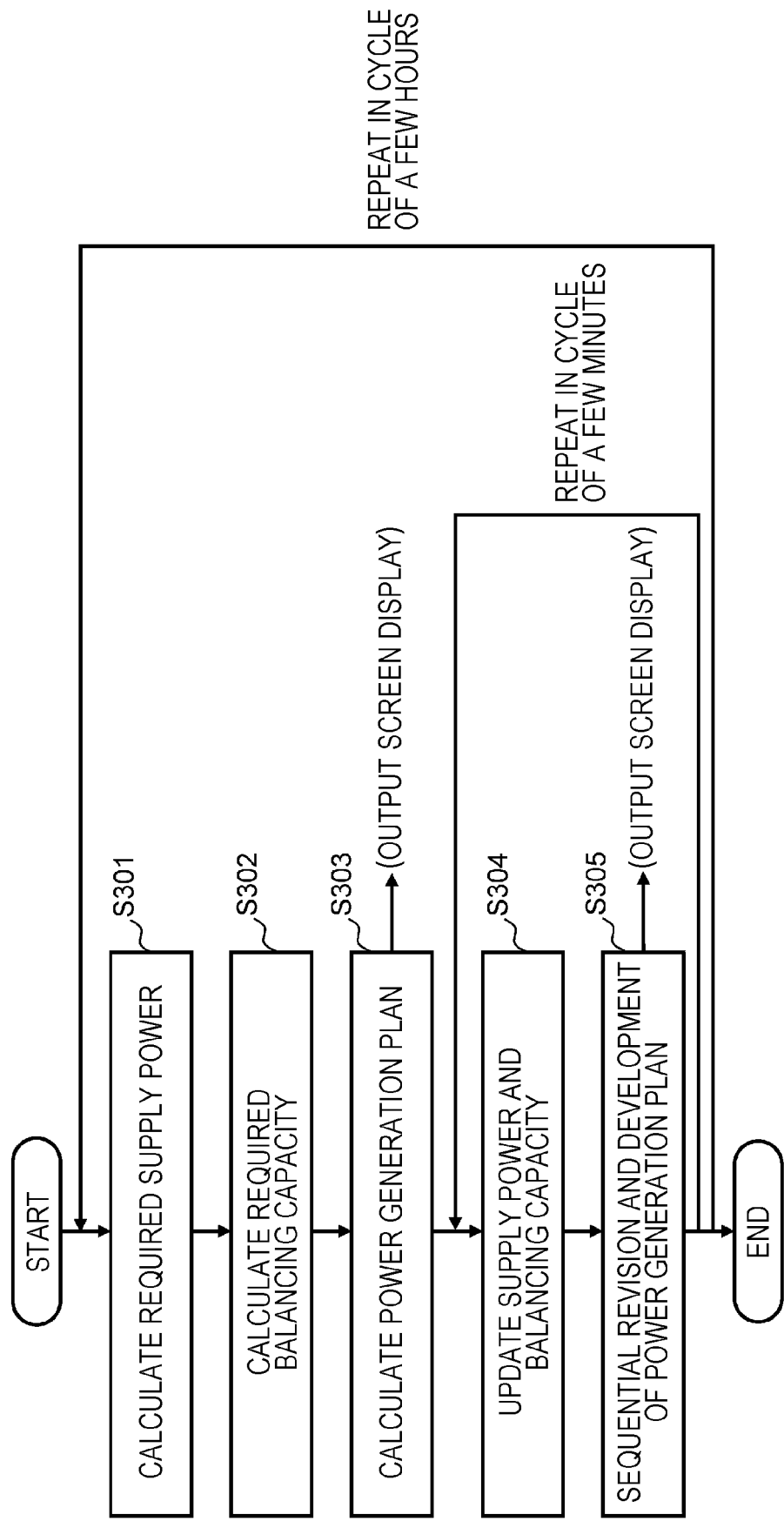
FIG. 3 is a diagram illustrating an example of a flowchart illustrating entire processing of the power generation planning apparatus according to the first embodiment.

FIG. 3 illustrates a flowchart illustrating the entire processing of the power generation planning apparatus 100.

In step S301, the supply power calculation unit 121 predicts a power generation output such as photovoltaic power generation from the weather forecast data 113 or the like for an electric generator other than a generation planning target interconnected to the power system, sums up demands calculated in demand prediction, and calculates the supply power required in the electric generator as the generation planning target.

In step S302, the balancing power calculation unit 122 calculates the balancing power to correct an error from a total output in a generation plan in an actual operation from a past demand fluctuation and an output fluctuation of the photovoltaic power generation. Note that, in a current status, a predetermined value (for example, about 2%) is set for a total demand in this balancing power.

In step S303, the power generation plan calculation unit 130 calculates the generation plan. More specifically, the power generation plan calculation unit 130 minimizes the following objective function by using, as inputs, the electric generator device data 111 such as power generation cost and start cost corresponding to the output of each electric generator, a maximum output, a minimum output, a continuous start time, a continuous stop time, an output change rate, and a period in which the electric generator is necessarily stopped and/or started for maintenance or test, the supply power calculated by the supply power calculation unit 121, and the balancing power calculated by the balancing power calculation unit 122, and calculates the generation plan of the start or stop schedule and the output power of the electric generator that satisfy constraint condition illustrated in the following examples. Note that, the calculated generation plan may be displayed on the display unit 201.

<Objective Function>

Power generation cost and start cost of all electric generators within planned time

[Math. 1]

$$F(P, u) = \sum_{t=1}^{T_{end}} \left( \sum_{i=1}^{N_{gen}} a_i P_{it}^2 + b_i P_{it} + C_i u_{it} + SUC_i(\Delta u_{it}) \right) \quad \text{(Equation 1)}$$

$T_{end}$: end time of plan
$N_{gen}$: number of electric generators
$a_i$, $b_i$, $c_i$: power generation cost coefficient
$P_{it}$: power generation output
$u_{it}$: discrete variable of 0 or 1 indicating start or stop
$\Delta u_{it}$: 1 (at start initiation point in time) 0 (others)
$SUC_i$: start cost <Constraint Condition>

Maximum or minimum electric generator output (output of each electric generator is within a range from maximum output to minimum output)

Demand-supply balance (shared demands match total power generation output)

Minimum continuous start or stop time (re-start or re-stop is after minimum continuous time)

Operation or stop period (stop or operation of electric generator is continuous for designated period)

Operation reserve capacity or required balancing power (excess capacity to correct error between actual operation and generation plan)

In the above description, it is possible to calculate an optimum solution that minimizes the objective function by dynamic programming or quadratic programming as described in NPL 1 and NPL 2.

In the following step S304 and step S305, the generation plan of the output of step S301 to step S303 is developed into a plan with a shorter time interval and is output to the database. Note that, step S304 and step S305 may be repeated at a shorter time interval.

In step S304, the input update unit 123 outputs the supply power and the balancing power at a shorter time interval by the same processing (function) as the supply power calculation unit 121 and the balancing power calculation unit 122. Note that, when a time interval of the generation plan is shorter than a time interval of the input from the power system information database 110, the input update unit 123 calculates an input with a short time interval by interpolation such as spline interpolation and linear interpolation.

In step S305, the power generation plan adjustment unit 140 calculates a generation plan with a time interval shorter than the generation plan calculated by the power generation plan calculation unit 130 by using, as inputs, the supply power and the balancing power with the short time interval updated by the input update unit 123 and the generation plan calculated by the power generation plan calculation unit 130.

Here, in step S303, an example of a case where the power generation plan calculation unit 130 calculates a start state as "1 (start)" or "0 (stop)" for every hour such that the start or stop schedule of each electric generator i is, for example, ui={0, 0, 0, 1, 1, 1, 0, 0, 0 . . . } at an interval of one hour is shown in Table 401 of FIG. 4. In this case, when a dashed line part of Table 401 of the generation plan is developed into a plan with a shorter time interval, for example, an interval of 15 minutes, the power generation plan adjustment unit 140 can set a start point in time to 1.5 H or the like which is a delayed time instead of 1.0 H as in Table 402 of FIG. 4. At this time, the start time of the electric generator with high power generation cost is set to a late time within a range that satisfies the constraint, and thus, a start time of the electric generator with high power generation cost is shortened. As a result, it is considered that (Equation 1) can be further minimized.

Thus, the power generation plan adjustment unit 140 may calculate such that, all start initiation points in time of all the electric generators are set to a late time as in Table 402 in order from the electric generator with high power generation cost. Further, as for stop initiation points in time of the electric generators, the power generation plan adjustment unit 140 may calculate such that all the stop initiation points in time of all the electric generators are set to an early time in order from the electric generator with high power generation cost.

Note that, although the start or stop initiation time is finely adjusted at a shorter time interval, the output of each electric generator is calculated based on the adjusted start or stop schedule.

As stated above, as for whether the electric generator is started or stopped, the power generation plan adjustment unit 140 adjusts the start initiation time and/or the stop initiation time such that the objective function of (Equation 1) is decreased based on the calculation result of the power generation plan calculation unit 130 and calculates the output of the electric generator corresponding to the adjusted start or stop initiation time.

Note that, the above step S301 to step S303 are repeated at a first time interval (for example, every hour), and the above step S304 and step S305 are repeated at a second time interval (for example, every 5 minutes) shorter than the first time interval. The results thereof are stored in the power generation plan database 150 and are displayed on the display unit 201.

(1-6) Effects

According to the present embodiment, when the calculation of the generation plan with short time interval or the update of the generation plan is performed, first, a start or stop plan indicating whether to start or stop the electric generator for each time is decided such that the constraint condition of the power system is satisfied by minimizing an evaluation function such as the total power generation cost at a long time interval. Subsequently, for this plan, a generation plan with a short time interval obtained by finely adjusting the start initiation time and/or the stop initiation time of the start or stop plan at a shorter time interval is calculated such that the constraint condition is satisfied and the evaluation function can be reduced.

Accordingly, since it is possible to calculate the generation plan on the assumption that the electric generator is started or not, it is possible to calculate the generation plan in a shorter time than when the generation plan including whether the electric generator is started or stopped at once at a short time intervals.

Further, when the start time and the stop time of the electric generator are finely adjusted, it is possible to further shorten a calculation time by deciding an order and an adjustment time of the electric generator to be finely adjusted so as to set the start initiation time to a late time and set the stop initiation time to an early time according to the order of the power generation cost of the electric generator.

(2) Second Embodiment

A second embodiment will be described below. Note that, the description that overlaps with the contents described in the first embodiment will be omitted.

(2-1) Configuration (Software)

Figure 5:
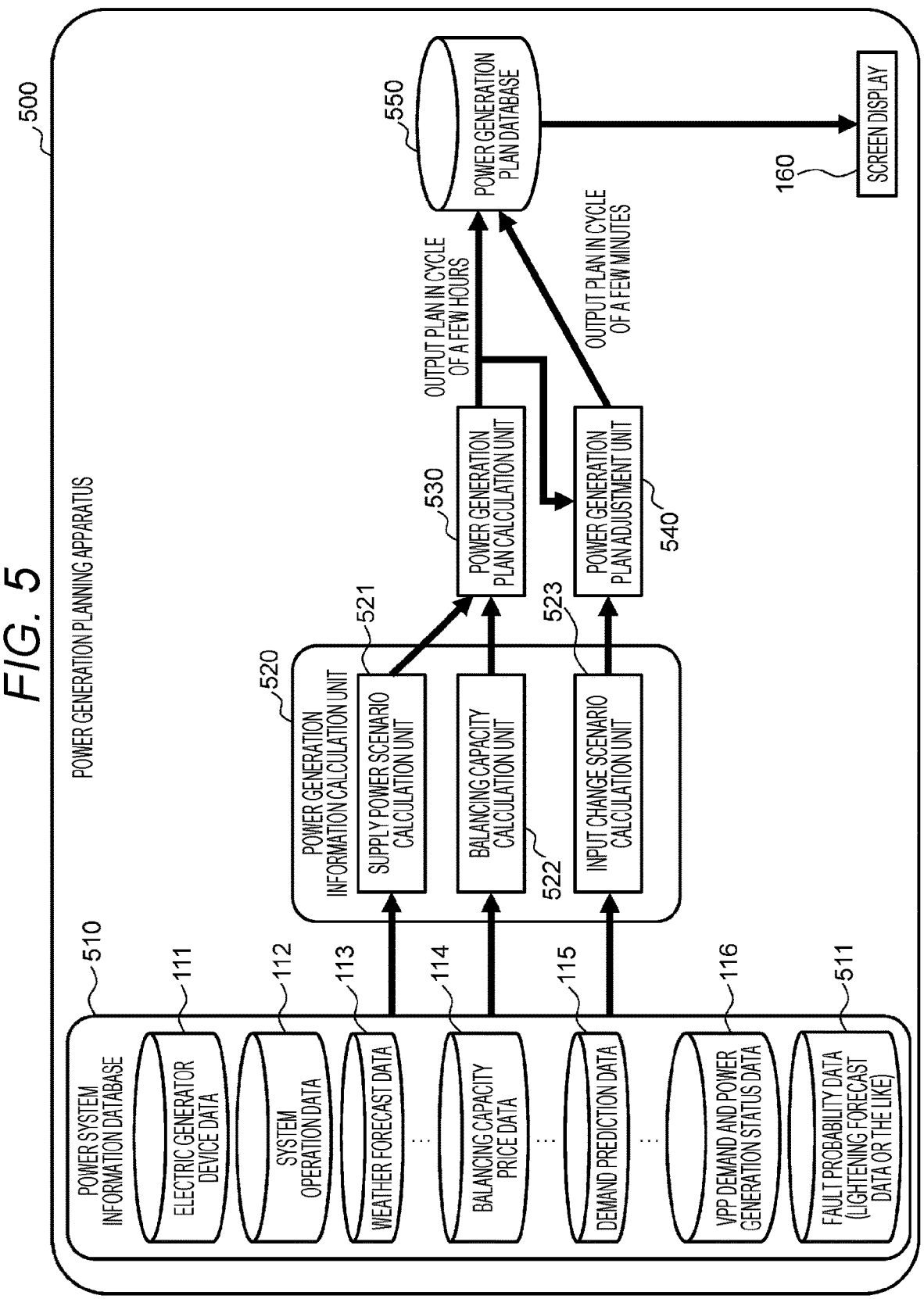
FIG. 5 is a diagram illustrating an example of a software configuration related to a power generation planning apparatus according to a second embodiment.

A power generation planning apparatus 500 of the present embodiment illustrated in FIG. 5 is mainly different from the first embodiment in that a supply power scenario calculation unit 521 and an input change scenario calculation unit 523 are added to a power generation information calculation unit 520.

(2-2) Action (Software)

The supply power scenario calculation unit 521 calculates a scenario case that simulates the prediction of power generation other than the generation planning target and an error distribution thereof by using a plurality of scenarios. The input change scenario calculation unit 523 outputs update values of both functions in a cycle and at a time interval shorter than the supply power scenario calculation unit 521 and a balancing power calculation unit 522. A power generation plan calculation unit 530 calculates a start or stop schedule based on the scenario and balancing power for each probability calculated by the supply power scenario calculation unit 521. A power generation plan adjustment unit 540 outputs a start or stop schedule at a shorter time interval or in a shorter cycle by finely adjusting the start or stop time of the electric generator for the start or stop schedule calculated by the power generation plan calculation unit 530. A power generation plan database 550 records the outputs of the power generation plan calculation unit 530 and the power generation plan adjustment unit 540 in the database. The data recorded in the power generation plan database 550 may be output to the screen display 160 on the display unit 201 or the like.

(2-3) Configuration and Operation (Hardware)

Since the hardware configuration of the power generation planning apparatus 500 is not changed from the first embodiment, the description thereof will be omitted.

(2-4) Processing Flowchart

Figure 6:
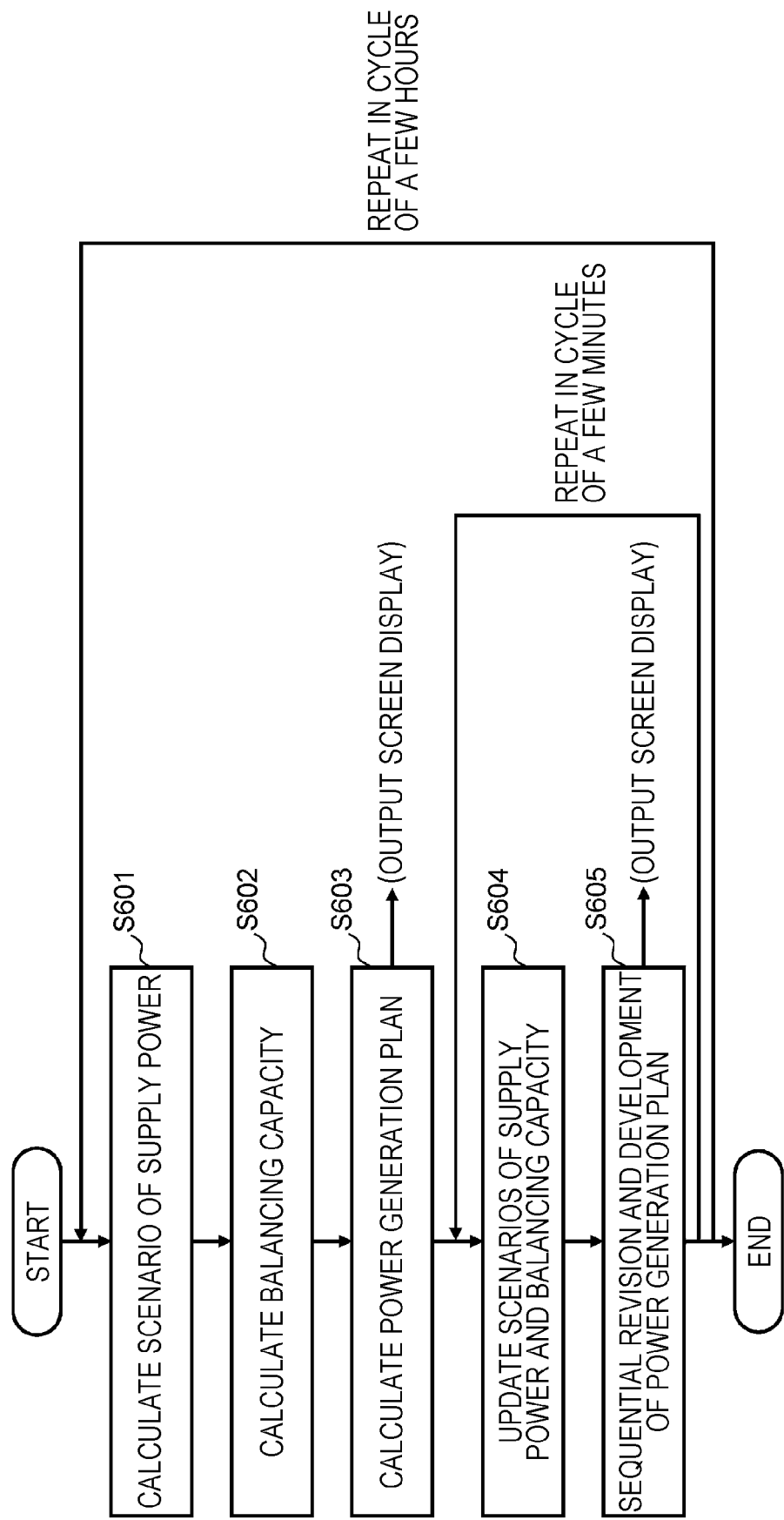
FIG. 6 is a diagram illustrating an example of a flowchart illustrating entire processing of the power generation planning apparatus according to the second embodiment.

FIG. 6 illustrates a flowchart illustrating the entire processing of the power generation planning apparatus 500.

In step S601, the supply power scenario calculation unit 521 calculates the plurality of scenarios (probability scenarios) by which the prediction of the power generation other than the generation planning target and an error distribution thereof are simulated.

Here, NPL 4 is introduced as an example of a predicted value and an error distribution thereof, that is, a prediction distribution from which prediction can be performed. A relationship between an input x indicated by temperature, cloud cover, climate, pressure, humidity, precipitation, solar irradiance, demand record, photovoltaic power generation record, prediction error record, or the like and a target to be predicted (prediction of total power generation other than the generation planning target) is approximated by the following (Equation 2), and a distribution including the prediction error is considered. Note that, $x=(X1, X2, \ldots XN)^T$, $y=(Y1, Y2, \ldots YN)^T$, and N elements $X_N$ and $Y_N$ are input and output as vectors, respectively, $\varepsilon$ is precision with which a variance is $\beta^{-1}$, and $w=(w0, w1, \ldots, wm)$ is a parameter of a coefficient matrix.

<NPL 4>
C. M. Bishop, "Pattern Recognition and Machine Learning Part. 1 Statistical Prediction by Bayesian Theory", Maruzen Publishing Co., Ltd., pp 28-31 (2012)

[Math. 2]

$$t = y(x, w) + \varepsilon = w_0 + w_1 x + w_2 x^2 + \cdots w_M x^M + \varepsilon = \sum_{j=0}^{M} w_j x^j + \varepsilon \quad \text{(Equation 2)}$$

In (Equation 2), a log-likelihood function using w and β is expressed by the following (Equation 3), and $w_{ML}$ which is w for allowing the best approximation precision of (Equation 2) can be calculated by maximizing a log-likelihood.

[Math. 3]

$$\ln p(t | x, w, \beta) = -\frac{\beta}{2} \sum_{n=1}^{N} \{y(x_n, w) - t_n\}^2 + \frac{N}{2} \ln \beta - \frac{N}{2} \ln(2\pi) \quad \text{(Equation 3)}$$

At this time, β indicating precision is expressed by (Equation 4).

[Math. 4]

$$\frac{1}{\beta_{ML}} = \frac{1}{N} \sum_{n=1}^{N} \{y(x_n, w_{ML}) - t_n\}^2 \quad \text{(Equation 4)}$$

The prediction expression including the prediction distribution by above (Equation 2) into which $w_{ML}$ is substituted and $\beta_{WL}^{-1}$ is expressed by (Equation 5). In (Equation 5), Dist indicates a normal distribution and is a prediction distribution of a variance $\beta^{-1}_{ML}$ with y(x, $w_{ML}$) as a mean value.

[Math. 5]

$$p(t|x,w_{ML},\beta_{ML}) = \text{Dist}(t|y(x,w_{ML}),\beta_{ML}^{-1}) \quad \text{(Equation 5)}$$

In this prediction distribution, the supply power scenario calculation unit 521 creates a scenario of the predicted value at each occurrence probability in a range of the distribution in order to reflect the distribution in the generation plan. Note that, this scenario is time-series data of a plurality of prediction patterns, and the distribution of these patterns at a target point in time follows the prediction distribution at the target point in time. In the creation of this scenario, a Monte Carlo method capable of creating data points that follow a specific probability distribution based on random numbers is utilized as in NPL 5. This Monte Carlo method is used, and thus, a scenario case that follows a predicted value of a total value of the power generation other than the generation planning target and an error distribution as the probability distribution occurs. Further, when a future occurrence probability is known for a factor caused by a fault of the power system (system fault) such as lightning from lightning forecast or the like, the supply power scenario calculation unit 521 may create a scenario of a demand and a power generation amount influenced by a system fault (scenario due to a probability distribution of a demand-supply change amount caused by the system fault) based on a demand amount or a power generation amount of a fault influence area and a probability, and may add the created scenario to the scenario case. Further, when there is a possibility that an output corresponding to a predetermined command cannot be performed for a facility (facility in which a plurality of devices is aggregated) regarded as one large-scale power plant such as a VPP that manages a plurality of consumers or electric generators, the supply power scenario calculation unit 521 may similarly add a scenario due to a distribution of this output deviation (output error) to the scenario case. As stated above, the scenario is added, and thus, it is possible to calculate the generation plan corresponding to the status of the power system.

<NPL 5>
Mingzhe Jin, "Data Science 3 Learning Through R Bayes Statistical Data Analysis", Kyoritsu Shuppan Co., Ltd., pp 46-81 (2010)

In step S602, the balancing power calculation unit 522 calculates the balancing power to correct an error from an actual value of the power generation other than the generation planning target and a predicted value thereof. Although approximately 2% of the total demand is set in this balancing power, a value of 2% or 3σ of a distribution variance σ in the prediction distribution in step S601 or a prediction distribution sequentially updated in step S604 to be described later may be set in the balancing power in order to secure the balancing power according to a fluctuation of an actual power system. Further, when the future occurrence probability is known for the factor caused by the system fault such as lightning from the accident probability data 511 such as the lightning forecast, the demand amount and the power generation amount in the fault influence area may be added to the balancing power. In addition, when there is a possibility that the VPP that manages the plurality of consumers or electric generators as one power plant cannot perform the output corresponding to a predetermined command, a difference from an instructed value may be added to the balancing power.

In step S603, the power generation plan calculation unit 530 calculates the start or stop plan that maximizes the objective function of the following (Equation 6) by using, as inputs, the electric generator device data 111 such as power generation cost and start cost corresponding to the output of each electric generator, a maximum output, a minimum output, a continuous start time, a continuous stop time, an output change rate, and a period in which the electric generator is necessarily stopped and/or started for maintenance or test, the scenario of the supply power calculated by the supply power scenario calculation unit 521, and the balancing power calculated by the balancing power calculation unit 522. As this minimization method, for example, there is stochastic programming of NPL 3.

Here, basically, it is not appropriate to secure the electric generator with low power generation cost due to the balancing power. However, when 2σ or 3σ of the prediction distribution in step S602 or step S604 is large and is equal to or greater than a preset threshold, since it is considered that an error from the generation plan in the actual operation is large and the frequency of utilization of the balancing power is high, the balancing power is secured from the electric generator with low power generation cost (the balancing power may be secured from the electric generator with relatively low power generation cost or the balancing power may be secured in order from the electric generator with lowest power generation cost.). On the other hand, when 2σ or 3σ of the prediction distribution is small and is equal to or less than a threshold, since it is considered that the frequency of utilization of the balancing power is small, the balancing power is secured from the electric generator with high power generation cost (the balancing power may be secured from the electric generator with relatively high power generation cost or the balancing power may be secured in order from the electric generator with highest power generation cost.). Note that, although the electric generator is used to secure the balancing power, an electric device such as a storage battery or a pumped storage generator may be used.

<Objective Function>

Power generation cost and start cost of all electric generators within planned time

[Math. 6]

$$F(P, u) = \sum_{1}^{S} PDist_s \sum_{t=1}^{T_{end}} \left( \sum_{i=1}^{N_{gen}} a_i P_{it}^2 + b_i P_{it} + C_i u_{it} \right) + \sum_{t=1}^{T_{end}} \left( \sum_{i=1}^{N_{gen}} SUC_i(\Delta u_{it}) \right) \quad \text{(Equation 6)}$$

$T_{end}$: end time of plan
$N_{gen}$: number of electric generators
$a_i$, $b_i$, $c_i$: power generation cost coefficient
$P_{it}$: power generation output
$u_{it}$: discrete variable of 0 or 1 indicating start or stop
$\Delta u_{it}$: 1 (at start initiation point in time) 0 (others)
$SUC_i$: start cost
S: number of assumed scenarios
PDists: occurrence probability of each scenario <Constraint Condition>

Maximum or minimum electric generator output (output of each electric generator is within a range from maximum output to minimum output)

Demand-supply balance (shared demands match total power generation output)

Minimum continuous start or stop time (re-start or re-stop is after minimum continuous time)

Operation or stop period (stop or operation of electric generator is continuous for designated period)

Operation reserve capacity or required balancing power (excess capacity to correct error between actual operation and generation plan)

In the following step S604 and step S605, the generation plan is developed into a generation plan with a shorter time interval and is output to the database based on the output of step S601 to step S603. Note that, step S604 and step S605 may be repeated at a shorter interval.

In step S604, the input change scenario calculation unit 523 sequentially output scenarios (probability scenarios) at a short time interval when the input is updated by the same processing (function) as the supply power scenario calculation unit 521 and the balancing power calculation unit 522. Here, after the calculation of the generation plan in step S603, the probability distributions are sequentially updated by utilizing data newly detected and stored in the database in order to reflect a change in the probability distribution of the supply power or the balancing power. As an example, Bayesian statistics of NPL 4 is utilized. As an initial value of the distribution from which w of (Equation 2) can be taken, a prior distribution with a precision parameter a in (Equation 7) is defined, and a prior distribution of w similarly calculated in a similar manner by (Equation 7) and (Equation 5) is expressed in (Equation 8).

[Math. 7]

$$p(w \mid \alpha) = Dist(w \mid 0, \alpha^{-1}I) = \left(\frac{\alpha}{2\pi}\right)^{(M+1)/2} \exp\left\{-\frac{\alpha}{2} w^T w\right\} \quad \text{(Equation 7)}$$

<Prior Distribution of w>

[Math. 8]

$$p(w|x,t,\alpha,\beta) \propto p(t|x,w,\beta)p(w|\alpha) \quad \text{(Equation 8)}$$

In (Equation 8), distributions of (Equation 8) before update is substituted into (Equation 8) with p(t|x, $w_{ML}$, $\beta_{ML}$) of (Equation 5) updated for each additional data and p(w|α), and thus, it is possible to sequentially update the distributions of w based on the additional data. The sequentially updated (Equation 8) and a distribution of (Equation 2) due to new data X are substituted into the prediction expression (Equation 9) with p(w|x, t) and p(t|X, w), respectively, and thus, it is possible to obtain prediction distributions sequentially updated whenever the data is updated. Note that, (Equation 10) can be obtained by approximating (Equation 9) to a normal distribution.

<Prediction Expression>

[Math. 9]

$$p(t|X,x,t) = \int p(t|X,w)p(w|x,t)dw \quad \text{(Equation 9)}$$

<Prediction Distribution Approximating to Normal Distribution>

[Math. 10]

$$p(t \mid x, X, t) = Dist(t \mid m(x), s^2(x)) \quad \text{(Equation 10)}$$

$$m(x) = \beta \phi(x)^T S \sum_{n=1}^{N} \phi(x_n) t_n$$

$$s^2(x) = \beta^{-1} + \phi(x)^T S \phi(x_n)$$

$$S^{-1} = \alpha 1 + \beta \sum_{n=1}^{N} \phi(x_n) \phi(x_n)^T$$

Here, I is an identity matrix, and φ(x) is a vector having an element of $\varphi_i = x_i$ (i=0, . . . M). The scenario of the supply power is created for each occurrence probability based on the sequentially updated prediction distribution of this (Equation 10) as in step S601. Note that, the value of 2σ or 3σ is set to the balancing power based on the prediction distribution updated by the balancing power calculation unit 522 as in step S602, and thus, it is determined whether 2σ or 3σ is equal or greater than the threshold. Accordingly, the device from which the balancing power is secured may be selected.

In step S605, the power generation plan adjustment unit 540 calculates a generation plan with a time interval shorter than the generation plan calculated by the power generation plan calculation unit 530 by using, as inputs, the generation plan calculated by the power generation plan calculation unit 530 in step S603 and the balancing power and the scenario of the supply power in the of step S604 in a cycle shorter than step S603.

Similarly to the first embodiment, it is assumed that the power generation plan calculation unit 530 in step S603 a start state as "1 (start)" or "0 (stop)" for every hour such that the start or stop schedule of each electric generator i is, for example, ui={0, 0, 0, 1, 1, 1, 0, 0, 0 . . . } at an interval of one hour. At this time, when the generation plan is developed into a plan with a shorter time interval, for example, an interval of 15 minutes, the power generation plan adjustment unit 540 can set the start point in time to an early time or a late time instead of 1.0 H. Thus, the power generation plan adjustment unit 540 finely adjusts the start or stop initiation time of each electric generator such that the objective function related to the total power generation cost of the scenario corresponding to the occurrence probability of (Equation 6) can be minimized.

At this time, when an unexpected event occurs in the power system for the prediction distribution assumed in step S601 after the execution of step S601, the prediction distribution (for example, variance σ) calculated by the sequential update of step S604 is larger than the prediction distribution in step S601, and there is a possibility that the constraint condition such as the demand-supply balance is not satisfied during sequential update.

In this case, first, when the power generation amount is insufficient, the start time of the electric generator to be started is set to an early time and the stop initiation time of the electric generator to be stopped is set to a late time in ascending order of the power generation cost of the electric generator. When the power generation amount is excessive, the start or stop time is reversely adjusted, and the deviation from the constraint condition is eliminated.

Here, in a case where the constraint condition is not satisfied by adjusting the start or stop time, the electric generator with low power generation cost next to the electric generators being started is additionally started when the power generation amount is insufficient, and the electric generator with highest power generation cost is stopped among the electric generators being started when the power generation amount is excessive.

Subsequently, in order to minimize the objective function of (Equation 6), the start initiation time of the electric generator with high power generation cost is set to a late time within the range that satisfies the constraint as in the first embodiment, and thus, the start time of the electric generator with high power generation cost is shortened. As a result, it is considered that (Equation 6) can be further minimized. Note that, although the start and stop initiation time is finely adjusted at a short time interval, the output of each electric generator is calculated based on the adjusted start or stop schedule.

As stated above, as for whether the electric generator is started or stopped, the power generation plan adjustment unit 540 finely adjusts the start or stop initiation time at a shorter time interval such that the objective function (Equation 6) is decreased based on the calculation result of the power generation plan calculation unit 530. Further, when the prediction distribution calculated by the sequential update of step S604 is significantly different from the prediction distribution in step S601, the power generation plan adjustment unit 540 performs the adjustment of the start initiation time and/or stop initiation time for eliminating the constraint deviation and additional start and/or stop of the electric generator. Further, the power generation plan adjustment unit 540 notifies an operator of a change in the generation status of the power system by using an alarm output (for example, notification using a notification device such as a speaker, a lamp, or a display capable of outputting sound, light, screen, or the like). As a result, the operator can respond to sudden a status change in the power system.

Note that, although the plan is output in a cycle shorter than the calculation of the start or stop plan of the electric generator in step S603 in sequential revision and deployment of the generation plan in step S605, the plan may be output depending on the determination of whether a difference between the prediction distribution calculated when the scenario of the supply power or the balancing power in step S604 is updated and the distribution (for example, variance σ) assumed in the previous sequential revision and development or the start or stop plan of the electric generator is equal to or greater than a threshold.

(2-5) Effect

In the present embodiment, the power generation planning apparatus 500 calculates the prediction distribution of the supply power, and calculates the plurality of scenarios that reflects the distribution. The power generation planning apparatus 500 calculates the generation plan that minimizes the expected value of the total power generation cost while satisfying the constraint based on this scenario and the occurrence probability of each scenario. Since a long calculation time is required to calculate the generation plan in consideration of the plurality of scenarios, the power generation planning apparatus 500 calculates the generation plan at a calculation interval of about one hour in order to shorten the calculation time, and updates the generation plan every few hours, for example. On the other hand, the power generation planning apparatus 500 outputs the generation plan at a shorter calculation interval and in a shorter cycle for the fine adjustment of the start or stop time of each electric generator in the following generation plan.

The power generation planning apparatus 500 sequentially updates the prediction distribution of the supply power or the balancing power whenever the data is updated by utilizing data of demand and power generation information updated with the passage of time. The power generation planning apparatus 500 finely adjusts the start or stop initiation time of the electric generator of the generation plan with the interval of one hour based on the plurality of scenarios that reflects this sequentially updated prediction distribution. At this time, as the variance of the updated prediction distribution becomes larger, the balancing power is secured from the electric generator with lower power generation cost. Accordingly, it is considered that the balancing power corresponding to the frequency of utilization of the balancing power can be secured. Note that, when there is the constraint deviation before the fine adjustment, the power generation planning apparatus 500 first adjusts the start initiation time and/or the stop initiation time such that the constraint deviation can be eliminated, and performs the additional start and/or stop of the electric generator when the constraint is not still satisfied. After the constraint condition is satisfied, the power generation planning apparatus 500 adjusts the start or stop initiation time such that the total power generation cost is minimized.

As described above, after the generation plan is calculated at the calculation interval of about one hour and whether the electric generator is started or stopped is decided, the start initiation time and/or stop initiation time of the generation plan is finely adjusted at a shorter time interval, and thus, it is possible to further shorten the calculation time than in the calculation of the generation plan at a short time interval. Furthermore, when the generation plan is finely adjusted at a shorter time interval, the prediction distributions are sequentially updated, and thus, it is possible to calculate the generation plan based on the current demand-supply state. In particular, when the system status is tight due to some kind of disturbance, the change in the system status is determined by updating the prediction distribution, and the generation plan is finely adjusted so as to be able to immediately respond to the change in the system status.

(3) Other Embodiments

Note that, although it has been described in the above-described embodiments that the present invention is applied to the power generation planning apparatus, the present invention is not limited thereto, and can be widely applied to various other systems, devices, methods, and programs.

Further, in the above description, information such as programs, tables, and files for realizing the functions can be stored in a storage device such as a memory, a hard disk, or a solid state drive (SSD), or a recording medium such as an IC card, AN SD card, or a DVD.

The configurations described above may be appropriately changed, rearranged, combined, or omitted without departing from the scope of the present invention.

REFERENCE SIGNS LIST 100 power generation planning apparatus
110 power system information database
120 power generation information calculation unit
130 power generation plan calculation unit
140 power generation plan adjustment unit
150 power generation plan database

The invention claimed is:

1. An apparatus for controlling power output of a plurality of electric generators, the apparatus comprising:
   a communication interface that is communicatively coupled to the electric generator;
   a memory; and
   a processor that is communicatively coupled to the memory and the communication interface,
   where in the processor is configured to:
   receive, using the communication interface, measurement data from the power system,
   calculate generation information regarding a demand of electric power and a supply of the electric power in the power system based on the measurement data,
   calculate a first prediction distribution of supply power from electric power information,
   calculate first plurality of scenarios based on the first prediction distribution,
   calculate a second prediction distribution of the supply power and second plurality of scenarios based on the second prediction distribution in a cycle shorter than the first prediction distribution based on electric power information sequentially updated,
   calculate a first generation plan for one or more of the plurality of the electric generators based on the first plurality of scenarios,
   calculate a second generation plan with a time interval shorter than the first generation plan by adjusting a start initiation time and/or a stop initiation time of the one or more of the plurality of electric generators in the first generation plan such that total power generation cost is reduced by using, as inputs, the first generation plan and the second plurality of scenarios, and
   control, using the communication interface, the one or more of the plurality of electric generators according to the second generation plan.

2. The apparatus according to claim 1, wherein the processor is further configured to,
   adjust the start initiation time to be a late time and the stop initiation time to be an early time in order from an electric generator among the plurality of electric generators with high power generation cost.

3. The apparatus according to claim 1, wherein the processor is further configured to:
   compare the first prediction distribution of the supply power with the second prediction distribution, and
   calculate the second generation plan when a change in variance of the first prediction distribution is equal to or greater than a threshold.

4. The apparatus according to claim 1, wherein the processor is further configured to:
   compare the first prediction distribution with the second prediction distribution and
   output, as an alarm, a change in a generation status of the power system to an operator when a change in variance of the first prediction distribution is equal to or greater than a threshold.

5. The apparatus according to claim 1, wherein the processor is further configured to:
   calculate the first generation plan and the second generation plan such that balancing power is secured by a first electric generator among the plurality of the electrical generators with low power generation cost when a variance of the first prediction distribution is large and the balancing power is secured by a second electric generator among the plurality of electrical generators with high power generation cost when the variance is small.

6. The apparatus according to claim 1, wherein the processor is further configured to:
   calculate at least one of a plurality of scenarios of supply power that reflects a probability distribution of a demand-supply change amount due to a fault of the power system and a plurality of scenarios of supply power that reflects a distribution of an output error of a facility in which a plurality of devices is aggregated.

* * * * *